United States Patent
Nishi et al.

(10) Patent No.: US 12,444,086 B2
(45) Date of Patent: Oct. 14, 2025

(54) THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

(71) Applicant: Panasonic Intellectual Property Corporation of America, Torrance, CA (US)

(72) Inventors: Takahiro Nishi, Nara (JP); Toshiyasu Sugio, Osaka (JP); Noritaka Iguchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 144 days.

(21) Appl. No.: 18/533,972

(22) Filed: Dec. 8, 2023

(65) Prior Publication Data

US 2024/0104782 A1  Mar. 28, 2024

Related U.S. Application Data

(63) Continuation of application No. PCT/JP2022/023464, filed on Jun. 10, 2022.

(60) Provisional application No. 63/210,171, filed on Jun. 14, 2021.

(51) Int. Cl.
G06T 9/00 (2006.01)
H04N 19/13 (2014.01)
H04N 19/146 (2014.01)

(52) U.S. Cl.
CPC ............. G06T 9/00 (2013.01); H04N 19/13 (2014.11); H04N 19/146 (2014.11)

(58) Field of Classification Search
CPC ......... H04N 19/13; H04N 19/146; G06T 9/00
See application file for complete search history.

(56) References Cited

U.S. PATENT DOCUMENTS

| 2014/0375638 | A1  | 12/2014 | Tomaru et al. |
| 2021/0049790 | A1* | 2/2021  | Gao ........................... G06T 9/00 |
| 2023/0401753 | A1* | 12/2023 | Takahashi ............... G06T 17/00 |

(Continued)

FOREIGN PATENT DOCUMENTS

| JP | 2017-126890 | 7/2017 |
| WO | 2014/020663 | 2/2014 |

OTHER PUBLICATIONS

International Search Report (ISR) issued on Sep. 6, 2022 in International (PCT) Application No. PCT/JP2022/023464.

*Primary Examiner* — Zhubing Ren
(74) *Attorney, Agent, or Firm* — Wenderoth, Lind & Ponack, L.L.P.

(57) ABSTRACT

A three-dimensional data encoding method includes: encoding, for each of second units, information about positions of three-dimensional points included in a first unit, to generate encoded data items, the second units being smaller than the first unit that is an encoding unit; and outputting the encoded data items. Each of the encoded data items includes no individual additional information. The encoded data items include common additional information. The common additional information includes first information indicating a size of a first encoded data item included in the encoded data items.

14 Claims, 10 Drawing Sheets

(56) References Cited

U.S. PATENT DOCUMENTS

2024/0054682 A1\* 2/2024 Bai ........................ G06T 9/00
2024/0163451 A1\* 5/2024 Gao ................... H04N 19/184

\* cited by examiner

FIG. 4

| geometry_prediction_tree_node( ) { | Descriptor |
|---|---|
|   if( first_point_in_column ) | |
|     while( true ) { | |
|       next_column_flag | ae(v) |
|       if( !next_column_flag ){ | |
|         first_point_in_column = 0 | |
|         break | |
|       } | |
|       column_pos++ | |
|     } | |
|   next_row_flag | ae(v) |
|   if( next_row_flag ){ | |
|     row_pos++ | |
|     if( row_pos == num_rows ){ | |
|       row_pos = 0 | |
|       column_pos++ | |
|       first_point_in_column = 1 | |
|     } | |
|   } | |
|   else{ | |
|     pred_mode | ae(v) |
|     residual_radius | ae(v) |
|     residual_phi | ae(v) |
|     residual_x | ae(v) |
|     residual_y | ae(v) |
|     residual_z | ae(v) |
|   } | |
|   ... | |
| } | |

FIG. 5

| geometry_prediction_tree_node( ) { | Descriptor |
|---|---|
|   next_row_flag | ae(v) |
|   if( next_row_flag ){ | |
|     row_pos++ | |
|     if( row_pos == num_rows ){ | |
|       row_pos = 0 | |
|       column_pos++ | |
|     } | |
|     if( row_pos == 0 ){ | |
|       while( true ) { | |
|         next_column_flag | ae(v) |
|         if( !next_column_flag) | |
|           break | |
|         column_pos++ | |
|       } | |
|     } | |
|   } | |
|   else{ | |
|     pred_mode | ae(v) |
|     residual_radius | ae(v) |
|     residual_phi | ae(v) |
|     residual_x | ae(v) |
|     residual_y | ae(v) |
|     residual_z | ae(v) |
|   } | |
|   ... | |
| } | |

FIG. 7

| byte_alignment( ) { | Descriptor |
|---|---|
|    alignment_bit_equal_to_one /* equal to 1 */ | f(1) |
|    while( !byte_aligned( ) ) | |
|       alignment_bit_equal_to_zero /* equal to 0 */ | f(1) |
| } | |

FIG. 8

| seq_parameter_set( ) { | Descriptor |
|---|---|
|    ... | |
|    sps_subset_enable_flag | u(1) |
|    if( sps_sub_partition_enabled_flag ){ | |
|       sps_subset_size_minus1 | ue(v) |
|       sps_subset_dependency_exist_flag | u(1) |
|       if( sps_subset_dependency_exist_flag ) | |
|          sps_subset_dependent_cabac_flag | u(1) |
|    } | |
|    ... | |
| } | |

FIG. 9

| geometry_prediction_tree_node( ) { | Descriptor |
|---|---|
| next_row_flag | ae(v) |
| if( next_row_flag ){ | |
| row_pos++ | |
| if( row_pos == num_rows ){ | |
| row_pos = 0 | |
| column_pos++ | |
| if(column_pos == subset_boundary){ | |
| subset_boundary += subset_size | |
| end_of_subset | ae(v) |
| byte_alignment( ) | |
| } | |
| } | |
| if( row_pos == 0 ){ | |
| while( true ){ | |
| next_column_flag | ae(v) |
| if( !next_column_flag) | |
| break | |
| column_pos++ | |
| if(column_pos == subset_boundary){ | |
| subset_boundary += subset_size | |
| end_of_subset | ae(v) |
| byte_alignment( ) | |
| } | |
| } | |
| } | |
| } | |
| ... | |
| } | |

THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

CROSS REFERENCE TO RELATED APPLICATIONS

This is a continuation application of PCT International Application No. PCT/JP2022/023464 filed on Jun. 10, 2022, designating the United States of America, which is based on and claims priority of U.S. Provisional Patent Application No. 63/210,171 filed on Jun. 14, 2021. The entire disclosures of the above-identified applications, including the specifications, drawings and claims are incorporated herein by reference in their entirety.

FIELD

The present disclosure relates to a three-dimensional data encoding method, a three-dimensional data decoding method, a three-dimensional data encoding device, and a three-dimensional data decoding device.

BACKGROUND

Devices or services utilizing three-dimensional data are expected to find their widespread use in a wide range of fields, such as computer vision that enables autonomous operations of cars or robots, map information, monitoring, infrastructure inspection, and video distribution. Three-dimensional data is obtained through various means including a distance sensor such as a rangefinder, as well as a stereo camera and a combination of a plurality of monocular cameras.

Methods of representing three-dimensional data include a method known as a point cloud scheme that represents the shape of a three-dimensional structure by a point cloud in a three-dimensional space. In the point cloud scheme, the positions and colors of a point cloud are stored. While point cloud is expected to be a mainstream method of representing three-dimensional data, a massive amount of data of a point cloud necessitates compression of the amount of three-dimensional data by encoding for accumulation and transmission, as in the case of a two-dimensional moving picture (examples include Moving Picture Experts Group-4 Advanced Video Coding (MPEG-4 AVC) and High Efficiency Video Coding (HEVC) standardized by MPEG).

Meanwhile, point cloud compression is partially supported by, for example, an open-source library (Point Cloud Library) for point cloud-related processing.

Furthermore, a technique for searching for and displaying a facility located in the surroundings of the vehicle by using three-dimensional map data is known (see, for example, Patent Literature (PTL) 1).

CITATION LIST

Patent Literature

PTL 1: International Publication WO 2014/020663

SUMMARY

Technical Problem

There has been a demand for shortening a delay time from generation of an encoded data item until output of the encoded data item, in a three-dimensional data encoding process and a three-dimensional data decoding process.

The present disclosure has an object to provide a three-dimensional data encoding method, a three-dimensional data decoding method, a three-dimensional data encoding device, or a three-dimensional data decoding device that is capable of shortening a delay time from generation of an encoded data item until output of the encoded data item.

Solution to Problem

A three-dimensional data encoding method according to one aspect of the present disclosure comprising: encoding, for each of second units, information about positions of three-dimensional points included in a first unit, to generate encoded data items, the second units being smaller than the first unit that is an encoding unit; and outputting the encoded data items, wherein each of the encoded data items includes no individual additional information, the encoded data items include common additional information, and the common additional information includes first information indicating a size of a first encoded data item included in the encoded data items.

A three-dimensional data decoding method according to one aspect of the present disclosure comprising: obtaining encoded data items generated by encoding, for each of second units, information about positions of three-dimensional points included in a first unit, the second units being smaller than the first unit that is an encoding unit; and decoding the encoded data items to generate the information about the positions of the three-dimensional points included in the first unit, wherein each of the encoded data items includes no individual additional information, the encoded data items include common additional information, and the common additional information includes first information indicating a size of a first encoded data item included in the encoded data items.

Advantageous Effects

The present disclosure provides a three-dimensional data encoding method, a three-dimensional data decoding method, a three-dimensional data encoding device, or a three-dimensional data decoding device that is capable of shortening a delay time from generation of an encoded data item until output of the encoded data item.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 4 is a diagram illustrating an example of syntax of a geometry information item according to the embodiment.

FIG. 5 is a diagram illustrating an example of syntax of a geometry information item according to the embodiment.

FIG. 7 is a diagram illustrating syntax for byte alignment processing according to the embodiment.

FIG. 8 is a diagram illustrating a syntax example of a header according to the embodiment.

FIG. 9 is a diagram illustrating a syntax example of geometry information corresponding to subset division according to the embodiment.

DESCRIPTION OF EMBODIMENT

Figure 1:
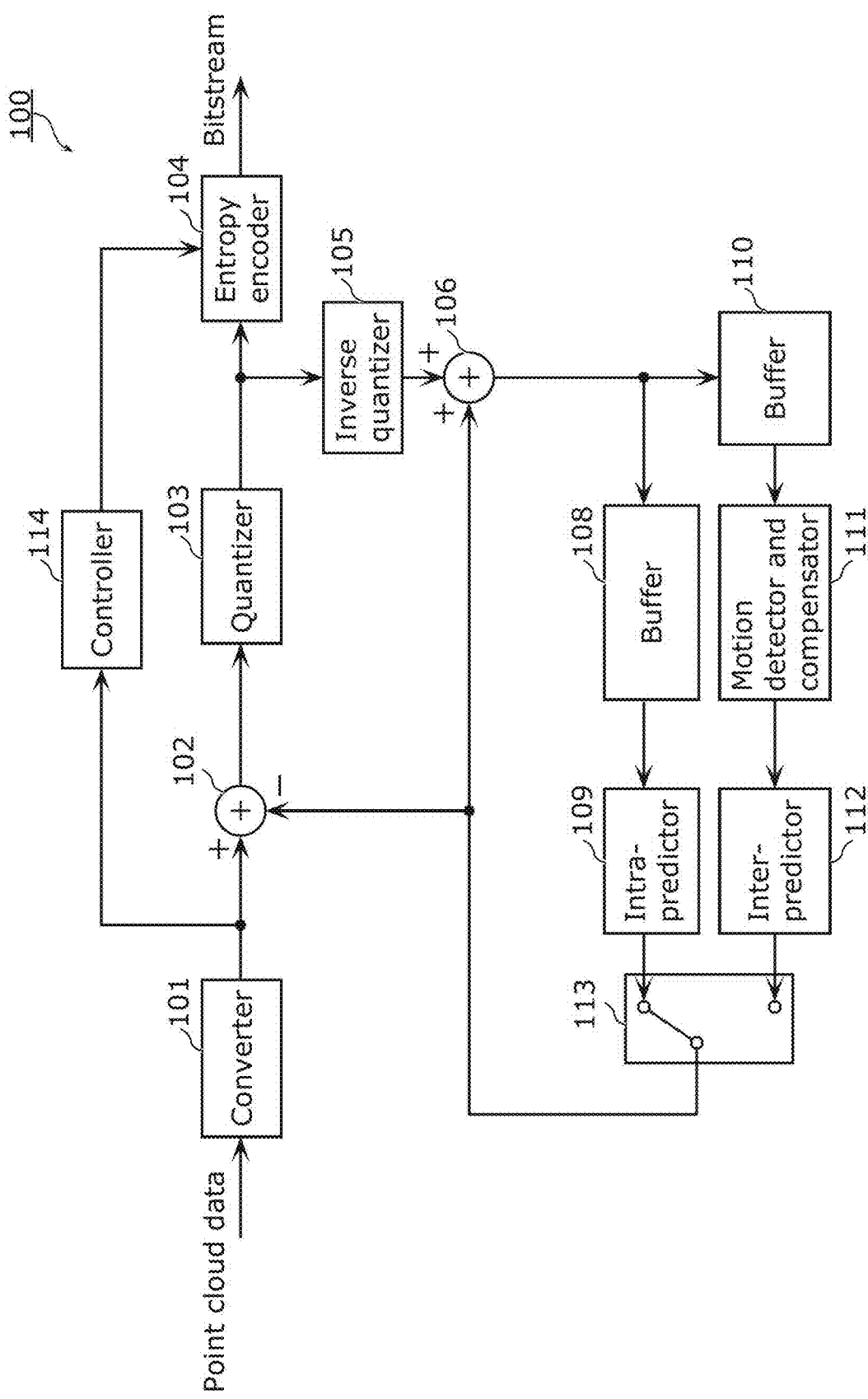
FIG. 1 is a block diagram of a three-dimensional data encoding device according to an embodiment.

A three-dimensional data encoding method according to one aspect of the present disclosure includes: encoding, for each of second units, information about positions of three-dimensional points included in a first unit, to generate encoded data items, the second units being smaller than the first unit that is an encoding unit; and outputting the encoded data items. Each of the encoded data items includes no individual additional information.

According to the foregoing, the three-dimensional data encoding method can output the encoded data item of the second unit without waiting for the encoded data item of the first unit to be collected to the end. As a result, it is possible to shorten a delay time from generation of an encoded data item until output of the encoded data item. Further, since the encoded data item of the second unit does not have individual additional information, it is possible to restrain an increase in the amount of processing for generating encoded data items of the second unit as compared with a case where the encoded data item of the second unit have individual additional information. Still further, since the second unit is not limited to a unit having additional information, it is possible to enhance the degree of freedom in generating the encoded data item of the second unit. As a result, for example, the sizes of encoded data items can be adjusted to a size suitable for transmission.

Note that the size of the second unit may be variable. In other words, the size of the encoded data item only needs to be smaller than the size of the first unit, and may be different from the sizes of an other encoded data item.

For example, the encoded data items may include common additional information. For example, the common additional information may include first information indicating a size of a first encoded data item included in the encoded data items.

According to the foregoing, a three-dimensional data decoding device can specify the terminal of the first encoded data item using the first information.

For example, the information about the positions of the three-dimensional points may express each of the positions using a distance component, a first direction component, and a second direction component, the information about the positions of the three-dimensional points may be encoded using predetermined reference positions, each of the reference positions may contain the first direction component and the second direction component, and the first information may indicate a size of the first direction component in the first encoded data item.

According to the foregoing, the size of an encoded data item can be expressed by the size of the first direction component, so that the data amount of first information can be reduced as compared with a case where the size of an encoded data item is expressed by the distance component, the first direction component, and the second direction component.

For example, each of the encoded data items may include second information indicating whether a terminate process is performed on the encoded data item.

According to the foregoing, it is possible to select whether the terminate process is performed in each second unit specified by the first information. Therefore, the degree of freedom in data division can be enhanced.

For example, the common additional information may include third information indicating whether an other encoded data item included in the encoded data items is used in encoding a first encoded data item included in the encoded data items.

According to the foregoing, it is possible to switch whether encoded data depends on an other encoded data item.

For example, the common additional information may include fourth information indicating whether a context depends on an other encoded data item included in the encoded data items, the context being used in arithmetic encoding a first encoded data item included in the encoded data items.

According to the foregoing, it is possible to switch whether encoded data depends on an other encoded data item. Further, there is a possibility that coding efficiency can be enhanced by switching whether a context is made to depend on an other encoded data item according to data.

A three-dimensional data decoding method according to one aspect of the present disclosure includes: obtaining encoded data items generated by encoding, for each of second units, information about positions of three-dimensional points included in a first unit, the second units being smaller than the first unit that is an encoding unit; and decoding the encoded data items to generate the information about the positions of the three-dimensional points included in the first unit. Each of the encoded data items includes no individual additional information.

According to the foregoing, the three-dimensional data decoding method can start decoding of an encoded data item of the second unit without waiting for an encoded data item of the first unit to be collected to the end. As a result, it is possible to shorten a delay time from reception of an encoded data item until start of decoding. Further, since the encoded data item of the second unit does not have individual additional information, it is possible to restrain an increase in the amount of processing for analyzing encoded data items of the second unit as compared with a case where the encoded data item of the second unit has individual additional information. Still further, since the second unit is not limited to a unit having additional information, it is possible to enhance the degree of freedom in generation of the encoded data item of the second unit. As a result, for example, the sizes of encoded data items can be adjusted to a size suitable for transmission.

For example, the encoded data items may include common additional information. For example, the common additional information may include first information indicating a size of a first encoded data item included in the encoded data items.

According to the foregoing, the three-dimensional data decoding method can specify the terminal of the first encoded data item using the first information.

For example, the information about the positions of the three-dimensional points may express each of the positions using a distance component, a first direction component, and a second direction component, the information about the positions of the three-dimensional points may be encoded using predetermined reference positions, each of the reference positions may contain the first direction component and the second direction component, and the first information may indicate a size of the first direction component in the first encoded data item.

According to the foregoing, the size of an encoded data item can be expressed by the size of the first direction component, so that the data amount of the first information can be reduced as compared with a case where the size of an encoded data item is expressed by the distance component, the first direction component, and the second direction component.

For example, each of the encoded data items may include second information indicating whether a terminate process is performed on the encoded data item.

According to the foregoing, it is possible to select whether a terminate process is performed in each second unit specified by the first information. Therefore, the degree of freedom in data division can be enhanced.

For example, the common additional information may include third information indicating whether an other encoded data item included in the encoded data items is used in encoding a first encoded data item included in the encoded data items.

According to the foregoing, it is possible to switch whether encoded data depends on an other encoded data item.

For example, the common additional information may include fourth information indicating whether a context depends on an other encoded data item included in the encoded data items, the context being used in arithmetic encoding a first encoded data item included in the encoded data items.

According to the foregoing, it is possible to switch whether encoded data depends on an other encoded data item. Furthermore, there is a possibility that coding efficiency can be enhanced by switching whether a context is made to depend on an other encoded data item according to data.

A three-dimensional data encoding device according to one aspect of the present disclosure includes a processor and memory. Using the memory, the processor: encodes, for each of second units, information about positions of three-dimensional points included in a first unit, to generate encoded data items, the second units being smaller than the first unit that is an encoding unit; and outputs the encoded data items. Each of the encoded data items includes no individual additional information.

According to the foregoing, the three-dimensional data encoding device makes it possible to output the encoded data item of the second unit without waiting for the encoded data item of the first unit to be collected to the end. As a result, it is possible to shorten a delay time from generation of an encoded data item until output of the encoded data item. Further, since the encoded data item of the second unit does not have individual additional information, it is possible to restrain an increase in the amount of processing for generating encoded data items of the second unit as compared with a case where the encoded data item of the second unit have individual additional information. Still further, since the second unit is not limited to a unit having additional information, it is possible to enhance the degree of freedom in generation of the encoded data item of the second unit. As a result, for example, the sizes of encoded data items can be adjusted to a size suitable for transmission.

A three-dimensional data decoding device according to one aspect of the present disclosure includes: a processor and memory. Using the memory, the processor: obtains encoded data items generated by encoding, for each of second units, information about positions of three-dimensional points included in a first unit, the second units being smaller than the first unit that is an encoding unit; and decodes the encoded data items to generate the information about the positions of the three-dimensional points included in the first unit. Each of the encoded data items includes no individual additional information.

According to the foregoing, the three-dimensional data decoding method makes it possible to start decoding of an encoded data item of the second unit without waiting for an encoded data item of the first unit to be collected to the end. As a result, it is possible to shorten a delay time from reception of an encoded data item until start of decoding. Further, since the encoded data item of the second unit does not have individual additional information, it is possible to restrain an increase in the amount of processing for analyzing encoded data items of the second unit as compared with a case where the encoded data item of the second unit has individual additional information. Still further, since the second unit is not limited to a unit having additional information, it is possible to enhance the degree of freedom in generation of the encoded data item of the second unit. As a result, for example, the sizes of encoded data items can be adjusted to a size suitable for transmission.

It is to be noted that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Hereinafter, embodiments will be specifically described with reference to the drawings. It is to be noted that each of the following embodiments indicate a specific example of the present disclosure. The numerical values, shapes, materials, constituent elements, the arrangement and connection of the constituent elements, steps, the processing order of the steps, etc., indicated in the following embodiments are mere examples, and thus are not intended to limit the present disclosure. Among the constituent elements described in the following embodiments, constituent elements not recited in any one of the independent claims will be described as optional constituent elements.

EMBODIMENT

First, a configuration of three-dimensional data encoding device 100 according to an embodiment will be described. FIG. 1 is a block diagram of three-dimensional data encoding device 100 according to the present embodiment. Three-dimensional data encoding device 100 generates a bit stream (encoded stream) by encoding point cloud data which are three-dimensional data.

The point cloud data includes position information of three-dimensional points. The position information indicates a three-dimensional position of each three-dimensional point. Note that the position information may also be referred to as geometry information.

For example, the position information is expressed in a polar coordinate system, and includes one distance component and two direction components (angular components). Specifically, the position information includes distance d, elevation angle θ, and horizontal angle φ. The point cloud data is, for example, data obtained by a laser sensor such as LiDAR.

Further, the point cloud data may include attribute information (color, reflectance, etc.) of each three-dimensional point in addition to position information. Further, although FIG. 1 illustrates a processor related to encoding of position information of point cloud data, three-dimensional data encoding device 100 may include other processors such as a processor for encoding attribute information, etc.

Three-dimensional data encoding device 100 includes converter 101, subtractor 102, quantizer 103, entropy encoder 104, inverse quantizer 105, adder 106, buffer 108, intra-predictor 109, buffer 110, motion detection compensator 111, inter-predictor 112, switcher 113, and controller 114.

Converter 101 generates conversion information by converting position information included in input point cloud data of an encoding target. Specifically, converter 101 generates information for associating reference positions with three-dimensional points. Further, converter 101 converts the position information of the three-dimensional points by using the reference positions. For example, the conversion information is the difference between the reference position and the position information of the three-dimensional point. The details will be described later. Note that converter 101 may have a buffer for holding converted position information. Further, converter 101 can also be referred to as a calculator for calculating a value to be encoded.

Subtractor 102 generates a residual signal (also referred to as a prediction residual) by subtracting a predictive value from the converted position information. Quantizer 103 quantizes the residual signal. Entropy encoder 104 generates a bitstream by performing entropy encoding on the quantized residual signal. Further, entropy encoder 104 performs entropy encoding on control information which is information, etc., generated by converter 101, and adds the encoded information to the bitstream.

Inverse quantizer 105 generates the residual signal by inverse quantizing the quantized residual signal obtained by quantizer 103. Adder 106 adds a predictive value to the residual signal generated by inverse quantizer 105 to restore the conversion information. Buffer 108 holds the restored conversion information as a reference point cloud for intra-prediction. Buffer 110 holds the restored conversion information as a reference point cloud for inter-prediction.

Since the restored conversion information includes a quantization error, the restored conversion information may not completely match original conversion information. Three-dimensional points which have been restored by performing the encoding processing and the decoding processing in this manner are referred to as encoded three-dimensional points, decoded three-dimensional points, or processed three-dimensional points.

Intra-predictor 109 calculates a predictive value by using conversion information of one or a plurality of reference points that are other processed three-dimensional points belonging to the same frame as a three-dimensional point to be processed (hereinafter referred to as a target point).

Motion detection compensator 111 detects (motion-detects) a displacement between a target frame being a frame including a target point and a reference frame being a frame different from the target frame, and corrects (motion-compensates) conversion information of a point cloud included in the reference frame based on the detected displacement. Information (motion information) indicating the detected displacement is stored, for example, in a bitstream.

Inter-predictor 112 calculates a predictive e value by using conversion information of one or a plurality of reference points included in a motion-compensated point group. Note that the motion detection and the motion compensation need not be performed.

Switcher 113 selects either the predictive value calculated by intra-predictor 109 or the predictive value obtained by inter-predictor 112, and outputs the selected predictive value to subtractor 102 and adder 106. In other words, switcher 113 performs switching between use of intra-prediction and use of inter-prediction. For example, switcher 113 calculates a cost value in the case of using intra-prediction and a cost value in the case of using inter-prediction, and selects a prediction method that provides a smaller cost value. Note that the cost value is, for example, a value based on a code amount after encoding, and the cost value decreases as the code amount is smaller. Note that even when a plurality of methods (a plurality of prediction modes) exist for each of the intra-prediction and the inter-prediction, the prediction mode to be used is likewise determined based on the cost value. Note that the prediction method (the intra-prediction or the inter-prediction) and the method for determining the prediction method are not limited to the above methods, and based on settings specified from the outside or characteristics of point cloud data, the methods may be determined or selectable candidates may be narrowed down.

Controller 114 determines a division boundary of encoded data based on conversion information output from converter 101. Further, controller 114 controls entropy encoder 104 to perform a terminate process of arithmetic encoding described later at the division boundary.

Note that three-dimensional data encoding device 100 may acquire position information expressed in an orthogonal coordinate system, convert the acquired position information in the orthogonal coordinate system to position information in a polar coordinate system, and perform the encoding processing described above on the acquired position information in the polar coordinate system. For example, three-dimensional data encoding device 100 may include a coordinate transformer for performing this coordinate transformation processing at a stage before converter 101. In this case, three-dimensional data encoding device 100 may generate the position information in the polar coordinate system by performing inverse conversion of the conversion processing performed in converter 101 on the conversion information restored by adder 106, convert the generated position information in the polar coordinate system to the position information in the orthogonal coordinate system, calculate the difference between the acquired position information in the orthogonal coordinate system and the input original position information in the orthogonal coordinate system, and store information indicating the calculated difference into a bitstream.

Figure 2:
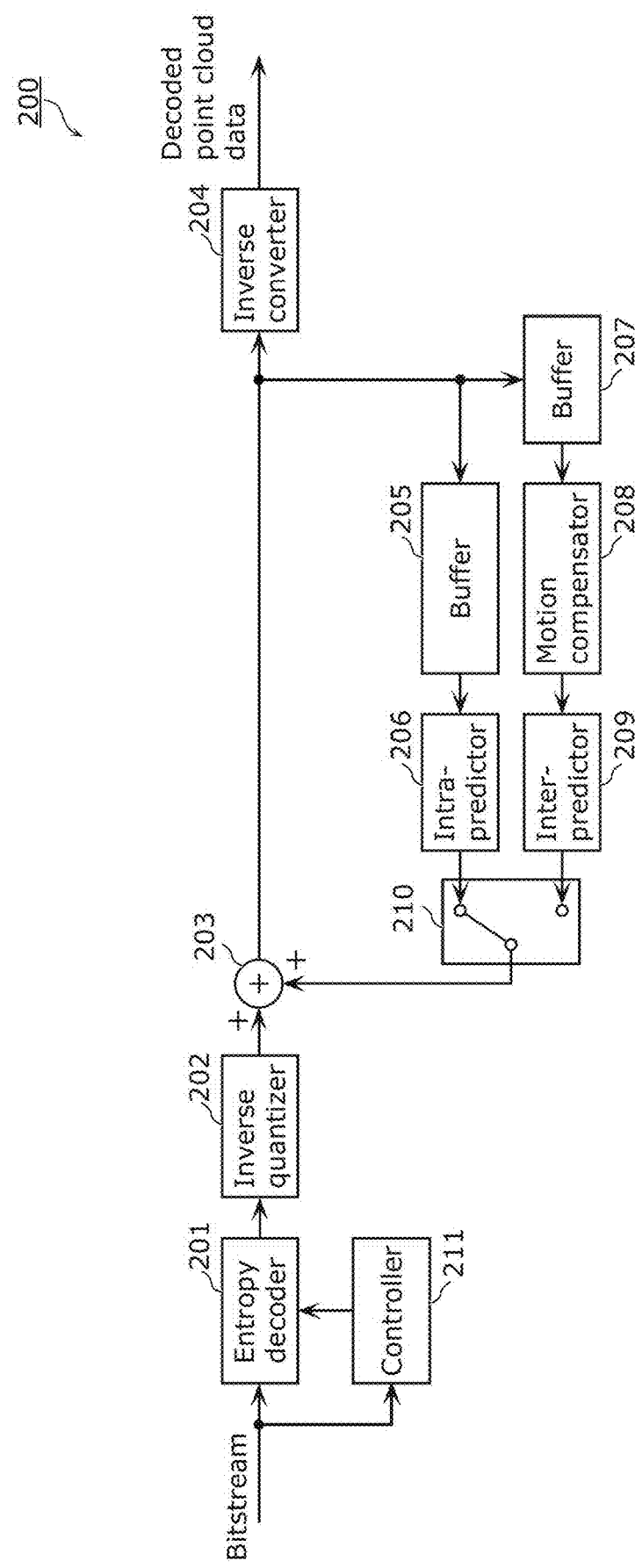
FIG. 2 is a block diagram of a three-dimensional data decoding device according to the embodiment.

Next, a configuration of three-dimensional data decoding device 200 for decoding the bitstream generated by three-dimensional data encoding device 100 will be described. FIG. 2 is a block diagram of three-dimensional data decoding device 200 according to the present embodiment. Although FIG. 2 illustrates a processor related to decoding of position information of a point cloud, three-dimensional data decoding device 200 may also include another processor such as a processor for decoding attribute information of a point cloud. For example, three-dimensional data decoding device 200 generates decoded point cloud data by decoding the bitstream generated by three-dimensional data encoding device 100 illustrated in FIG. 1.

Three-dimensional data decoding device 200 includes entropy decoder 201, inverse quantizer 202, adder 203, inverse converter 204, buffer 205, intra-predictor 206, buffer 207, motion-compensator 208, inter-predictor 209, switcher 210, and controller 211.

Three-dimensional data decoding device 200 acquires bitstreams generated in three-dimensional data encoding device 100.

Controller 211 monitors received bitstreams (encoded data), and detects a division boundary of a bitstream based on information included in the bitstream. Controller 211 controls entropy decoder 201 to perform a terminate process of arithmetic decoding described later at the detected division boundary. This bitstream corresponds to a bitstream output from entropy encoder 104 in three-dimensional data encoding device 100.

Entropy decoder 201 generates a quantized residual signal, control information, etc., by performing entropy decoding on the received bitstream.

Inverse quantizer 202 generates a residual signal by inverse quantizing the quantized residual signal obtained by entropy decoder 201. Adder 203 restores the conversion information by adding the predictive value to the residual signal generated by inverse quantizer 202.

Inverse converter 204 restores the position information by subjecting the conversion information to the inverse conversion of the conversion processing which was performed by converter 101. Specifically, inverse converter 204 acquires information for associating reference positions with three-dimensional points from the bitstream, and associates the reference positions with the three-dimensional points based on the acquired information. Further, inverse converter 204 converts the conversion information of the three-dimensional points into position information by using the reference positions. For example, inverse converter 204 calculates position information by adding the conversion information and the reference positions. Further, inverse converter 204 can also be referred to as a calculator for calculating position information from decoded values. This position information is output as decoded point cloud data.

Buffer 205 holds the conversion information restored by adder 203 as a reference point cloud for intra-prediction. Buffer 207 holds the conversion information restored by adder 203 as a reference point cloud for inter-prediction. Intra-predictor 206 calculates a predictive value using conversion information of one or a plurality of reference points which are other three-dimensional points to which the same frame as the target point belongs.

Motion compensator 208 acquires motion information indicating the displacement between the target frame and the reference frame from the bitstream, and corrects (motion-compensates) conversion information of a point cloud included in the reference frame based on the displacement indicated by the motion information. Inter-predictor 209 calculates a predictive value using conversion information of one or a plurality of reference points included in the motion-compensated point cloud. Note that the motion compensation need not be performed.

Switcher 210 selects either the predictive value calculated by intra-predictor 206 or the predictive value obtained by inter-predictor 209, and outputs the selected predictive value to adder 203. For example, switcher 210 acquires information indicating the prediction method (intra-prediction or inter-prediction) from the bitstream, and determines the prediction method to be used based on the acquired information. Note that even if a plurality of methods (a plurality of prediction modes) exist for each of the intra-prediction and the inter-prediction, information indicating the prediction mode is likewise obtained from the bitstream, and the prediction mode to be used is determined based on the obtained information.

Note that three-dimensional data decoding device 200 may convert decoded position information expressed in the polar coordinate system to position information expressed in the orthogonal coordinate system, and output the position information expressed in the orthogonal coordinate system. For example, three-dimensional data decoding device 200 may include a coordinate converter for performing this coordinate conversion at a stage after inverse converter 204. In this case, three-dimensional data decoding device 200 acquires information indicating the difference between the original position information in the orthogonal coordinate system before encoding and decoding and the position information in the orthogonal coordinate system after decoding from the bit stream. Three-dimensional data decoding device 200 may convert the position information in the polar coordinate system restored by inverse converter 204 into position information in the orthogonal coordinate system, add the difference indicated by the above information to the obtained position information in the orthogonal coordinate system, and output the obtained position information in the orthogonal coordinate system.

Figure 3:
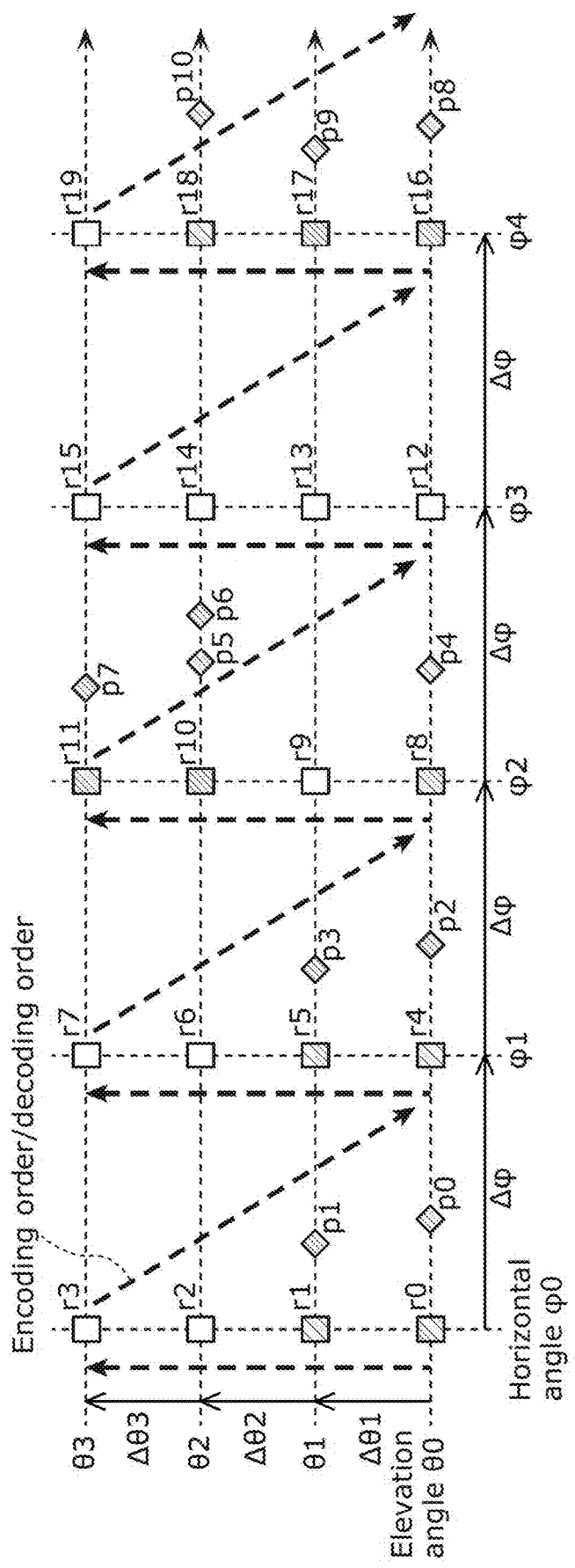
FIG. 3 is a diagram illustrating an encoding order of three-dimensional points according to the embodiment.

Next, operation of three-dimensional data encoding device 100 will be described. FIG. 3 is a diagram illustrating operation of transformer 101. FIG. 3 is a diagram illustrating an encoding order (processing order) of three-dimensional points (reference positions) in the encoding process.

In FIG. 3, a horizontal direction represents horizontal angle $\phi$ in polar coordinates, and a vertical direction represents elevation angle $\theta$ in the polar coordinates. Transformer 101 sets reference positions rm (m=0, 1, 2, ... ) (also referred to as reference points). Here, reference positions rm are each expressed with horizontal angle $\phi$ and elevation angle $\theta$. In other words, reference positions rm are each expressed with two components ($\theta$, $\phi$) out of three components (d, $\theta$, $\phi$) that express a position information item on a three-dimensional point. In addition, in the example illustrated in FIG. 3, reference positions rm indicated by squares in the figure are set based on sampling interval $\Delta\phi$ that is a horizontal sampling interval of LiDAR and scan-line interval $\Delta\theta k$ of LiDAR (k=1, 2, 3). In other words, the reference positions are set based on combinations of predetermined horizontal angles and elevation angles and disposed on a plane expressed by horizontal angle $\phi$ and elevation angle $\theta$ in a matrix pattern. In the example illustrated in FIG. 3, intervals $\Delta\phi$ between horizontal angles $\phi j$ (j=0, 1, 2, ... ) of the reference positions are constant. Intervals between elevation angles $\theta k$ (k=0, 1, 2, 3) of the reference positions can be set individually.

Transformer 101 performs an encoding process (a transform process) on points pn (n=0, 1, 2, ... ) indicated by rhombi located in the vicinities of the reference positions in an order indicated by dashed arrows in the figure. Hatched squares indicate first reference positions where points referring to the reference positions are present, and squares not hatched indicate second reference positions where points referring to the reference positions are not present.

The points referring to the reference position are points based on the reference positions. The points are associated with the reference positions (encoded (transformed) using the reference positions) as will be described later. In addition, the points referring to the reference positions are each a point of which values of horizontal angle $\phi$ and elevation angle $\theta$ are included within their respective ranges including the corresponding reference position. For example, the points referring to the reference positions are points pn that have horizontal angles being greater than or equal to φj and less than φj+Δφ and are on the same scan line (have the same elevation angle). The range in horizontal angle is not limited to this. The range in horizontal angle may be, for example, greater than or equal to φj-Δφ/2 and less than φj+Δφ/2.

The processing order (encoding order) illustrated in FIG. 3 is based on processing units (corresponding to columns in FIG. 3) each consisting of reference positions having horizontal angles of the same value (e.g., r0 to r3), and in each processing unit, the reference positions are processed (encoded) in an order based on the elevation angle (ascending order in FIG. 3). The processing units (corresponding to the columns in FIG. 3) are processed in an order based on the horizontal angle (ascending order in FIG. 3). In other words, the reference positions are processed in ascending order of elevation angle for each set of reference positions having horizontal angles of the same value. The reference positions may be processed in ascending order of horizontal angle for each set of reference positions having elevation angles of the same value.

In encoding (transforming) of a target point, transformer 101 generates information for identifying a position (φj, θk) of reference position rm that is referred to by target point pn. Transformer 101 generates an offset (φ$_o$n, θ$_o$n) from the reference position to the target point and information for identifying distance information dn on the target point. Here, φ$_o$n is a difference between horizontal angle φj of the reference position and a horizontal angle of the target point, and θ$_o$n is a difference between elevation angle θk of the reference position and an elevation angle of the target point.

The information for identifying the position of the reference position that is referred to by the target point, offset (φ$_o$n, θ$_o$n) from the reference position to the target point, and the information for identifying distance information dn on the target point each may be information for identifying a difference value from a predicted value generated based on processed information or may be information for identifying the value itself.

Three-dimensional data encoding device 100 may also store sampling interval Δφ that is a horizontal sampling interval of LiDAR and scan-line interval Δθk of LiDAR in a bitstream. For example, the three-dimensional data encoding device may store Δφ and Δθk in a header of an SPS or a GPS. Accordingly, three-dimensional data decoding device 200 can set the reference positions, using Δφ and Δθk.

Here, the SPS (sequence parameter set) is a sequence-based parameter set (control information) where a sequence includes frames. The SPS is also a parameter set common to geometry information and attribute information. The GPS (geometry parameter set) is a frame-based parameter set. The GPS is a parameter set for geometry information.

Transformer 101 may also transform sampling interval Δφ being a horizontal sampling interval of LiDAR and scan-line interval Δθk of LiDAR to values that are rounded to integer values having a predetermined bit width, and store the transformed values in a bitstream. The example illustrated in FIG. 3 is an example in which the number of scan lines (the number of elevation angles) is 4 but can be carried out in the case where another number of scan lines such as 16, 64, or 128 is used.

Next, syntax of the geometry information will be described. FIG. 4 is a diagram illustrating an example of syntax of a geometry information item on each point. In syntax examples shown in FIG. 4 and FIG. 5, parameters (signals) stored in a bitstream are written in bold type. Three-dimensional data encoding device 100 repeatedly applies this syntax for each reference position rm to generate column_pos, which indicates an index of horizontal angle φj of reference position rm serving as a reference for point pn to be processed next, and row_pos, which indicates an index of elevation angle θk of reference position rm, and further generates parameter relating to point pn.

In this example, three-dimensional data encoding device 100 initializes variables before processing a first point. Specifically, three-dimensional data encoding device 100 sets first_point_in_column, which indicates a first piece of syntax corresponding to horizontal angles φj, to 1, sets column_pos to 0, and sets row_pos to 0. Alternatively, three-dimensional data encoding device 100 may notify three-dimensional data decoding device 200 of a value of column_pos and a value of row_pos of the first point, in advance of syntax corresponding to the first point. In this case, three-dimensional data encoding device 100 and three-dimensional data decoding device 200 may apply this syntax, using these values after setting first_point_in_column to 0.

Next, three-dimensional data encoding device 100 generates next_column_flag at reference position rm corresponding to a position having an elevation angle being θ0 (i.e., in the case where first_point_in_column is 1). next_column_flag indicates whether there is one or more points based on horizontal angles φj corresponding to the position of reference position rm. In other words, next_column_flag indicates whether there is a point that refers to any one of reference positions having the same horizontal angle as horizontal angles φj of reference position rm. For example, in the case where there is one or more points based on horizontal angle φj corresponding to the position of reference position rm (e.g., horizontal angles φ0, φ1, φ2, and φ4 illustrated in FIG. 3), next_column_flag is set to 0, and in the case where there is no point based on horizontal angle φj corresponding to the position of reference position rm (e.g., horizontal angle φ3 illustrated in FIG. 3), next_column_flag is set to 1. next_column_flag is provided for each horizontal angle φj (for each column in FIG. 3).

By repeatedly generating next_column_flag until next_column_flag becomes 0, three-dimensional data encoding device 100 can generate information that enables identification of horizontal angle φj corresponding to point pn to be processed next (φ0+column_pos×Δφ). Accordingly, it may be possible to reduce a code amount required to notify next_row_flag described below.

Whether to notify next_column_flag can be determined by whether row_pos is 0, as will be shown in FIG. 5 described later. However, determination with first_point_in_column enables avoidance with the notification of next_column_flag, which is also unnecessary in the case where there are points at a position of row_pos being 0, and thus can reduce the code amount.

Three-dimensional data encoding device 100 generates next_row_flag at each candidate position of reference position rm serving as a reference for point pn to be processed next. next_row_flag indicates whether there is point pn to be processed at a position of elevation angle θk. In other words, next_row_flag indicates whether there is a point that refers to reference position rm. For example, when there is point pn to be processed at a position of elevation angle θk, next_row_flag is set to 0 (e.g., r0 and r1 in FIG. 3), and when there is no point pn to be processed at a position of elevation angle θk (e.g., r2 and r3 in FIG. 3), next_row_flag is set to 1. next_row_flag is provided for each reference position.

When next_row_flag is 1, three-dimensional data encoding device 100 repeatedly applies the syntax illustrated in FIG. 4 to generate next_row_flag corresponding to each candidate position consecutively. By repeating this process until next_row_flag becomes 0, three-dimensional data encoding device 100 can generate information that enables identification of elevation angle θk corresponding to point pn to be processed next. For example, elevation angle θk corresponding to point pn to be processed next is given by (Expression 1) shown below.
[Math. 1]

$$\theta 0 + \Sigma_{k=0}^{row\_pos} \Delta\theta k, \text{but } \Delta\theta 0 = 0 \qquad \text{(Expression 1)}$$

When row_pos reaches the number of scan lines (num_rows illustrated in FIG. 4), the process proceeds to next horizontal angle ϕj. At this time, three-dimensional data encoding device 100 sets row_pos to 0, increases column_pos by 1, and sets first_point_in_column to 1.

In the above-described manner, three-dimensional data encoding device 100 can generate the information items (next_column_flag and next_row_flag) that enable the identification of horizontal angle ϕj and elevation angle θk of reference position rm serving as the reference for point pn to be processed.

Subsequently, three-dimensional data encoding device 100 generates information relating to a distance of target point pn, information relating to an offset in horizontal angle from reference position rm to target point pn, and pred_mode, which is information relating to a prediction method for these parameters. Here, the information relating to the distance is, for example, residual residual_radius, which indicates a difference between the distance of the target point and a predicted value generated by a predetermined method. The information relating to the offset in horizontal angle is, for example, residual residual_phi, which indicates a difference between offset ϕ$_o$n in horizontal angle and a predicted value generated by a predetermined method.

The predicted values are calculated based on, for example, information on a processed three-dimensional point. For example, the predicted values are at least some of parameters of one or more processed three-dimensional points located in the vicinity of the target point. In this example, three-dimensional data encoding device 100 omits generation of information relating to an offset in elevation angle assuming that an offset in elevation angle is always 0. However, three-dimensional data encoding device 100 may generate information relating to an offset in elevation angle from reference position rm to point pn to be processed and store the information in a bitstream. For example, the information relating to an offset in elevation angle is residual residual_theta, which indicates a difference between offset θ$_o$n of an elevation angle and a predicted value generated by a predetermined method.

Three-dimensional data encoding device 100 may transform position information items in a Cartesian coordinate system being input to position information items expressed in a polar coordinate system, and perform the encoding process on the obtained position information items expressed in the polar coordinate system. In this case, three-dimensional data encoding device 100 may transform again position information items in the polar coordinate system encoded and decoded (e.g., position information items generated by inverse transforming signals output from adder 106 illustrated in FIG. 1) to position information items in the Cartesian coordinate system, calculate differences between the obtained position information items in the Cartesian coordinate system and original position information items in the Cartesian coordinate system being input, and store information indicating the differences in a bitstream. The information indicating the differences includes, for example, correction values residual_x, residual_y, and residual_z on X, Y, and Z axes, respectively. In other words, in the case where the transform between the coordinate systems is not performed, residual_x, residual_y, and residual_z need not be included in the bitstream.

next_column_flag, next_row_flag, pred_mode, residual_radius, residual_phi, residual_theta, residual_x, residual_y, and residual_z generated in the above-described manner are stored in a bitstream and sent to three-dimensional data decoding device 200. It should be noted that all or some of these signals may be entropy encoded (arithmetic-encoded) by entropy encoder 104 before being stored in the bitstream.

As described above, three-dimensional data encoding device 100 can determine values of syntax elements for each candidate position for reference position rm by using the information items for identifying horizontal angle ϕj and elevation angle θk of reference position rm serving as the reference for point pn to be processed next and the flags (next_column_flag and next_row_flag) associated with each candidate position. In addition, it may be possible to make the encoding process, the decoding process, a data send process, or the like less delayed.

It should be noted that application of values to the syntax including next_column_flag, next_row_flag, and the like as well as the variables such as first_point_in_column in the description is merely an example. For example, the application may be changed such that 0 and 1 are inversely applied. This case can be carried out by conforming related conditional determinations and the like.

Next, another example of the syntax will be described. FIG. 5 is a diagram illustrating an example of the syntax of a geometry information item on each point. Three-dimensional data encoding device 100 repeatedly applies this syntax for each reference position rm to generate column_pos, which indicates an index of horizontal angle ϕj of reference position rm serving as a reference for point pn to be processed next, and row_pos, which indicates an index of elevation angle θk of reference position rm, and further generates parameter relating to point pn. The example shown in FIG. 5 differs from the example shown in FIG. 4 in the method of generating next_row_flag and next_column_flag used for identifying the values of column_pos and row_pos.

In this example, three-dimensional data encoding device 100 first initializes variables before applying the syntax to a first point. Specifically, three-dimensional data encoding device 100 notifies three-dimensional data decoding device 200 of a value of column_pos and a value of row_pos of the first point, in advance of syntax corresponding to the first point. In other words, for example, three-dimensional data encoding device 100 stores the value of column_pos and the value of row_pos of the first point in a bitstream. Three-dimensional data encoding device 100 and three-dimensional data decoding device 200 apply the syntax with these values.

Next, three-dimensional data encoding device 100 generates next_row_flag for reference position rm at a position indicated by next_row_flag and next_column_flag and notifies three-dimensional data decoding device 200 whether there is point pn based on reference position rm at the position.

When next_row_flag is 1, three-dimensional data encoding device 100 first increases row_pos by 1. Next, three-dimensional data encoding device 100 determines whether row_pos has reached the number of scan lines (num_rows shown in FIG. 5). When row_pos reaches the number of scan lines, three-dimensional data encoding device 100 sets row_pos to 0 and increases column_pos by 1, determining that a candidate position is to be shifted to next horizontal angle ϕj. Next, three-dimensional data encoding device 100 determines whether row_pos is 0. When row_pos is 0, three-dimensional data encoding device 100 generates one or more next_column_flag and repeatedly increases column_ pos by 1 until next_column_flag becomes 0. Thereafter, three-dimensional data encoding device 100 repeatedly applies the syntax shown in FIG. 5 until next_row_flag becomes 0.

When next_row_flag is 0, three-dimensional data encoding device 100 determines the values indicated by next_row_ flag and next_column_flag at the time to be an index of horizontal angle ϕj and an index of elevation angle θk of reference position rm serving as a reference for point pn to be processed next and stores parameters relating to point pn to be processed next (e.g., pred_mode, residual_radius, residual_phi, residual_x, residual_y, and residual_z shown in FIG. 5) in a bitstream as in the example shown in FIG. 4. Horizontal angle ϕj can be calculated by ϕ0+column_pos× Δϕ, using values of the indices and sampling interval Δϕ that is a horizontal sampling interval of LiDAR. Elevation angle θk can be calculated by (Expression 1) shown above, using the values of the indices and scan-line interval Δθk of LiDAR.

In the case where the transform between the coordinate systems is not performed, residual_x, residual_y, and residual_z need not be included in the bitstream. residual_theta may be included in the bitstream.

In the above-described manner, the notification of next_column_flag can be limited only to the case where row_pos=0 and next_row_flag=1, and thus it may be possible to reduce a code amount.

As described above, three-dimensional data encoding device 100 can determine values of syntax elements for each candidate position for reference position rm by using the information items for identifying horizontal angle ϕj and elevation angle θk of reference position rm serving as the reference for point pn to be processed next and the flags (next_column_flag and next_row_flag) associated with each candidate position. In addition, it may be possible to make the encoding process, the decoding process, a data send process, or the like less delayed.

It should be noted that application of values to the syntax including next_column_flag, next_row_flag, and the like in the description is merely an example. For example, the application may be changed such that 0 and 1 are inversely applied. This case can be carried out by conforming related conditional determinations and the like.

Figure 6:
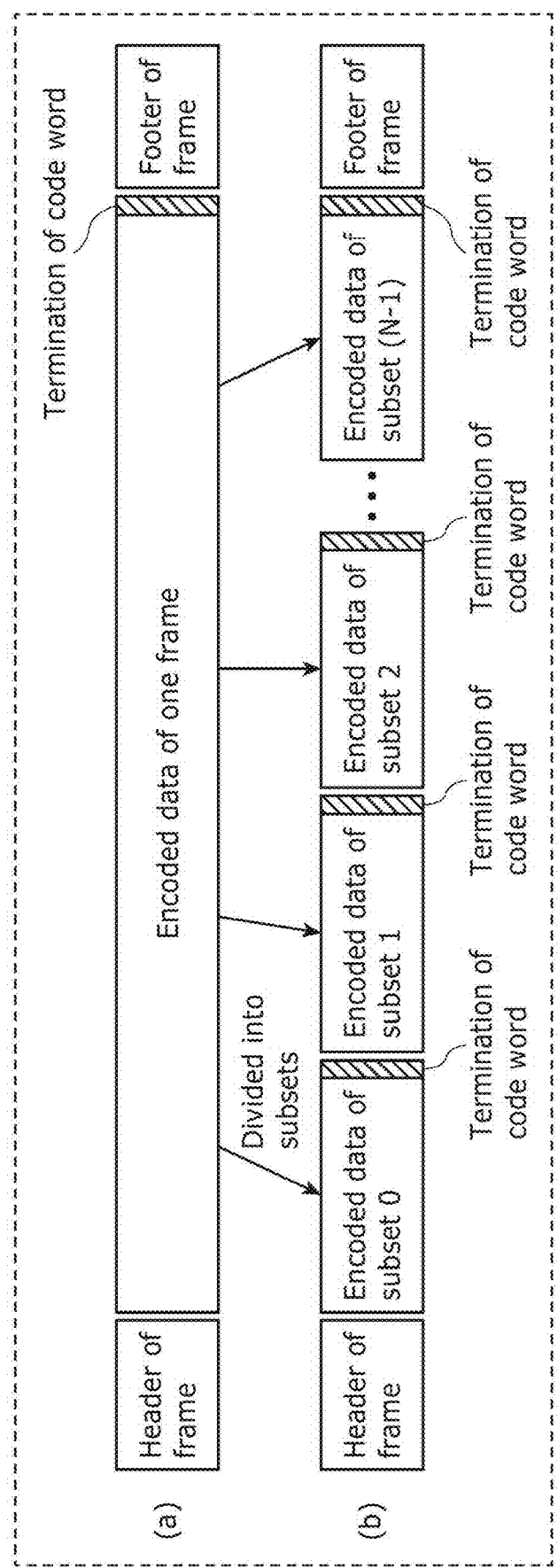
FIG. 6 is a diagram illustrating divided bitstreams according to the embodiment.

The processing of controller 114 will be described below. FIG. 6 is a diagram for describing the processing of controller 114, and is a diagram illustrating an example of divided bitstreams. In the figure, (a) illustrates a bitstream generated by encoding point cloud data of one frame, for example, illustrates a bitstream output from entropy encoder 104. The bitstream illustrated in (a) of the figure includes encoded data obtained by seamlessly encoding one frame (arithmetic encoded data for one frame). The bitstream also includes a header of a frame and a footer of the frame.

In the figure, (b) illustrates an example of divided bitstreams. Controller 114 performs control for dividing encoded data of one frame into encoded data of a plurality of subsets. Here, the division of encoded data is not performed after all the encoded data of one frame have been generated, but encoded data of subsets are sequentially generated while the encoded data of one frame are being generated. Furthermore, three-dimensional data encoding device 100 may sequentially transmit the generated encoded data without waiting for generation of encoded data of all subsets.

Here, when information including positions of a three-dimensional point cloud is encoded by using arithmetic encoding, one code word is configured in a processing unit such as a frame as illustrated in (a) of FIG. 6. Further, a code word terminate process is generally performed at the end of a processing unit so that the information can be extracted up to last information during decoding. Further, byte alignment processing is performed as necessary to add a specific bit pattern so that the end of the data is located at a position corresponding to an integral multiple of a byte length from the head of the bitstream. Here, the processing including the byte alignment processing is referred to as the terminate process.

On the other hand, in the present embodiment, as illustrated in (b) of FIG. 6, controller 114 performs the code word terminate process on the encoded data of the frame at every predetermined position, thereby dividing the data of one frame into encoded data of a plurality of subsets. At this time, the encoded data of each subset has neither header nor footer. In other words, three-dimensional data encoding device 100 does not append the header and footer for each subset unit to the bitstream. Note that the header and footer for each subset are not necessarily required, but three-dimensional data encoding device 100 may append at least one of the header and footer for each subset to the bitstream. In this case, the header and footer for each subset include, for example, information of a part of information included in the header of the frame or the footer of the frame.

In this way, three-dimensional data encoding device 100 divides data of one frame into encoded data of a plurality of subsets by performing the code word terminate process on the encoded data of the frame at every predetermined position. As a result, three-dimensional data encoding device 100 can, for example, packetize encoded data for each subset and immediately send out the obtained data. As a result, it is possible to shorten the delay time from generation of encoded data until output of the encoded data. In three-dimensional data decoding device 200, it is also possible to shorten the delay time from reception of encoded data until start of decoding. Therefore, there is a possibility that the time required from encoding to decoding can be shortened.

Note that in (a) and (b) of FIG. 6, the bitstream has both a frame header and a frame footer, but may have only one of the frame header and the frame footer.

FIG. 7 is a diagram illustrating syntax for byte alignment processing. Note that the syntax is syntax for byte alignment processing defined by Recommendation ITU-T H. 266|International Standard ISO/IEC 23090-3 Versatile Video Coding.

For example, three-dimensional data encoding device 100 may perform byte alignment processing for inserting "1" and consecutive "0" using the syntax illustrated in FIG. 7. Note that three-dimensional data encoding device 100 does not necessarily need to use this syntax, and may use other syntax. For example, three-dimensional data encoding device 100 may use a syntax in which alignment_bit_equal_to_one is omitted and only consecutive "0" is inserted for alignment.

An example in which a frame is divided into subsets has been described, but another processing unit such as a slice in which information including the positions of three-dimensional points is encoded may be divided into subsets. Further, the processing unit before division is, for example, an encoding unit. Here, the encoding unit is a unit for encoding processing and decoding processing, and is configured by one or a plurality of random access units. In other words, the data of the processing unit is data that can be individually decoded. Further, the data of the subset does not have additional information. In other words, the data of the subset is not individually decodable.

Next, a configuration of header information will be described. FIG. 8 is a diagram illustrating a syntax example of a header included in the bitstream illustrated in (b) of FIG. 6, and is a diagram illustrating a syntax example of a sequence parameter set (SPS).

Further, an example of semantics of each signal illustrated in FIG. 8 is shown below. In the example, sps_subset_enabled_flag having a value of 1 indicates that subset division is enabled for a plurality of frames referring to the SPS in the bitstream, and sps_subset_enabled_flag having a value of 0 indicates that subset division is disabled for a plurality of frames referring to the SPS in the bitstream.

The value obtained by adding the value of 1 to sps_subset_size_minus1 indicates the number of columns at the reference position corresponding to data included in one subset (subset section) of the frame referring to the SPS in the bitstream.

Here, sps_subset_dependency_exist_flag having a value of 1 indicates that a first subset of the frame referring to the SPS in the bitstream may be dependent on a second subset of the frame, which precedes the first subset in the encoding order. Further, sps_subset_dependency_exist_flag having a value of 0 indicates that the subset of the frame referring to the SPS in the bitstream is independent from other subsets of the frame. Here, dependence means that information of the other subsets is used (referred to) when a processing target subset is encoded or decoded. Furthermore, independence means that information of other subsets is not used (not referred to) when the processing target subset is encoded or decoded.

Here, sps_subset_dependent_cabac_flag having a value of 1 indicates that an initial entropy context state of a subset of the frame referring to the SPS in the bitstream may depend on a final entropy context state of a preceding subset of the frame, and determination of the context of the subset of the frame may also depend on decoded parameters of the preceding subset of the frame. Further, sps_subset_dependent_cabac_flag having a value of 0 indicates that determination of the context of a first subset of the frame referring to the SPS in the bitstream is independent from a second subset of the frame, which precedes the first subset. If subset division is not available, sps_subset_dependent_cabac_flag is set to a value of 0. Here, dependence means that information (context or parameters) of other subsets is used (referred to) when arithmetic encoding or arithmetic decoding is performed on a processing target subset. Further, independence means that information (context or parameters) of other subsets is not used (not referred to) when arithmetic encoding or arithmetic decoding is performed on a processing target subset.

As illustrated in these examples, three-dimensional data encoding device 100 may store, into the sequence parameter set (SPS), information indicating whether data of one frame is divided into data of a plurality of subsets, for example, like sps_subset_enabled_flag. Further, in the case where data of one frame is divided into data of a plurality of subsets, three-dimensional data encoding device 100 may store, into SPS, information indicating whether information regarding the size of a subset like sps_subset_size_minus1 and information of processed subsets in the same frame like sps_subset_dependency_exist_flag are allowed to be referred to from a processing target subset. Furthermore, when allowing that the information of the processed subset in the same frame is referred to from the processing target subset, three-dimensional data encoding device 100 may store, in SPS, the information indicating whether the context of the processed subset in the same frame is allowed to be referred to from the processing target subset like sps_subset_dependent_cabac_flag.

For example, the information regarding the size of the subset is information indicating the range of reference position rm or the number of reference positions rm included in one subset. For example, the information regarding the size of the subset indicates the number of columns of reference position included in one subset among reference positions illustrated in FIG. 3. Specifically, the information regarding the subset is information indicating the number of column_pos indicating an index of horizontal angle φj of reference position rm. Note that the information regarding the size of the subset may be any information that can specify a predetermined size in both the encoding processing and the decoding processing such as information regarding the size of encoded data. In other words, the information regarding the size of the subset may be information indicating a reference position or three-dimensional point included in the subset, or may be information indicating the size of encoded data.

Further, sps_subset_size may be used instead of sps_subset_size_minus1. Still further, sps_subset_size is set to a value of 0 when subset division is not applied, and set to a value of 1 or more indicating the size of the subset when subset division is applied.

Further, when it is allowed to refer to the information of the processed subset in the same frame from a processing target subset, three-dimensional data encoding device 100 may, for example, select the context of a processing target subset by referring to information of reference positions or three-dimensional points included in other processed subsets in the same frame, or may inherit and use a context obtained as a result of encoding a subset which is just preceding in the encoding order in the same frame. Further, three-dimensional data encoding device 100 may perform intra-prediction, for example, by referring to information of reference positions or three-dimensional points included in other processed subsets in the same frame. In other words, three-dimensional data encoding device 100 calculates a predictive value by using information of reference positions or three-dimensional points included in other processed subsets in the same frame, and calculate the difference between the position information of the target point and the predictive value.

When it is not allowed to refer to the information of the processed subset in the same frame from the processing target subset, three-dimensional data encoding device 100 refers to the information of the reference positions or three-dimensional points included in the same subset to select the context of the processing target subset without referring to information of reference positions or three-dimensional points included in other subsets. Further, three-dimensional data encoding device 100 does not inherit the context obtained as a result of encoding a subset which is just preceding in the encoding order in the same frame. Still further, three-dimensional data encoding device 100 may refer to information of reference positions or three-dimensional points included in the same subset to perform intra-prediction without referring to information of reference positions or three-dimensional points included in other subsets.

Further, three-dimensional data encoding device 100 stores other information such as sps_subset_dependent_cabac_flag in the bitstream, whereby it is possible to separately restrict information affecting context selection (such as the last context of a previous subset or information to be referred to during context selection such as information of reference positions and three-dimensional points) from being referred to beyond subset boundaries.

As described above, by making it possible to refer to the information of the processed subset even when subset division is performed, three-dimensional data encoding device 100 may be capable of shortening the time required from encoding until decoding while restraining deterioration in coding efficiency caused by the division to the minimum level. Further, by prohibiting only information affecting context selection from being referred to beyond subset boundaries, it is possible to independently perform arithmetic encoding of each subset, so that error resilience may be enhanced while restraining deterioration in encoding efficiency. Further, by prohibiting the information of processed subsets from being referred to, it is possible to perform parallel processing in a subset unit while restraining overhead of division as compared with a case where division having a header such as a slice is performed, so that it may be possible to improve the throughput of encoding processing and decoding processing.

Although an example in which a frame is divided into subsets has been described, other processing units such as slices in which information including the positions of three-dimensional points is encoded may be divided into subsets. Further, although the syntax example in SPS has been illustrated above, three-dimensional data encoding device 100 may store all or part of the parameters shown above into a geometry parameter set (GPS), a header of a frame, or a header of a slice.

Further, with respect to the context selection, the intra-prediction, etc., the same processing as in three-dimensional data encoding device 100 is also performed in three-dimensional data decoding device 200.

Next, a syntax example of geometry information corresponding to subset division will be described. FIG. 9 is a diagram illustrating a syntax example of geometry information corresponding to subset division. The syntax shown in FIG. 9 has a content related to subset boundaries which is added to the syntax illustrated in FIG. 5. Further, since syntax elements of pred_mode onward are the same as those in FIG. 5, description of these syntax elements is omitted in FIG. 9.

In the example illustrated in FIG. 9, three-dimensional data encoding device 100 makes determination as to a subset boundary based on column_pos, and when a subset boundary is determined, three-dimensional data encoding device 100 stores subset terminate information (for example, end_of_subset illustrated in FIG. 9) into the bitstream, and also performs an arithmetic code terminate process including byte alignment. Note that a parameter subset_size illustrated in FIG. 9 is set to a value obtained by adding the value of 1 to sps_subset_size_minus1 illustrated in FIG. 8. Further, a variable subset_boubdary used to make determination as to a subset boundary is a variable representing a next subset boundary position. Subset_boubdary is initialized to subset_size at the head of the frame. Thereafter, each time a subset boundary is determined, subset_size is added to subset_boundary. In other words, encoded data is divided for each number of columns indicated by subset_size with respect to reference positions illustrated in FIG. 3. For example, when subset_size has a value of 2, a plurality of subsets are set such that each subset includes encoded data of two columns at the reference positions illustrated in FIG. 3.

Note that the subset terminate information (end_of_subset) is fixed to a value of 1, and three-dimensional data encoding device 100 may always perform the arithmetic code terminate process when storing the subset terminate information. In this case, the division processing (terminate process) is always performed for each number of columns indicated by subset_size.

Alternatively, three-dimensional data encoding device 100 may set the subset terminate information (end_of_subset) to either the value of 0 or the value of 1, and perform the arithmetic code terminate process in the case of the value of 1, and need not perform the terminate process in the case of the value of 0. Note that when the arithmetic code terminate process is not performed (when the subset terminate information has the value of 0), three-dimensional data encoding device 100 also omits the byte alignment (byte_alignment( )) immediately after end_of_subset illustrated in FIG. 9. In this case, by setting the subset terminate information to the value of 0, it is possible to perform no division processing (terminate process) between two subsets and treat the two subsets as one subset. Therefore, the degree of freedom in the size (for example, number of columns) of each subset can be enhanced.

Alternatively, three-dimensional data encoding device 100 need not store the subset terminate information, and may always perform the arithmetic code terminate process when a subset boundary is determined.

Furthermore, three-dimensional data encoding device 100 may switch the determination of the subset boundary between ON and OFF according to sps_subset_enabled_flag. When sps_subset_enabled_flag indicates that subset division is not to be performed (for example, the value of 0), three-dimensional data encoding device 100 need not perform division by setting the determination of a subset boundary to OFF.

Furthermore, the syntax illustrated in FIG. 9 is an example in which this syntax is continued to be processed even after the arithmetic code terminate process has been performed. However, the processing may be resumed from the head of this syntax after the arithmetic code terminate process has been performed. At that time, three-dimensional data encoding device 100 may notify three-dimensional data decoding device 200 of the value of column_pos and the value of row_pos at a head point after the resumption antecedently to this syntax corresponding to the head point after the resumption. In this case, three-dimensional data decoding device 200 may apply this syntax by using these values.

Also, here, an example in which a content corresponding to subset division is added to the syntax illustrated in FIG. 5 has been described, but the same content as this example is inserted into the syntax illustrated shown in FIG. 4 immediately after increment processing of column_pos, thereby coping with the subset division.

Figure 10:
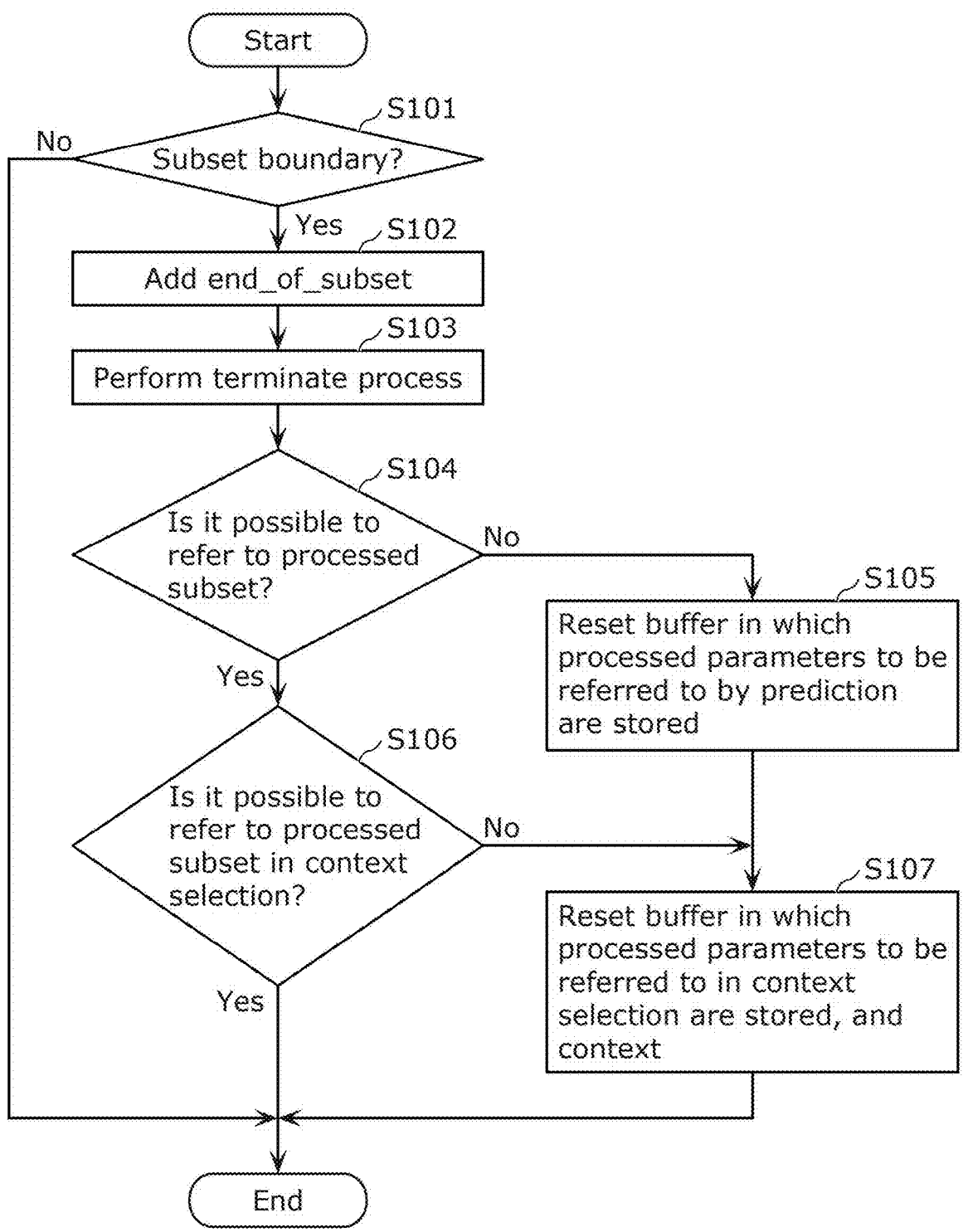
FIG. 10 is a flowchart of processing related to a subset boundary according to the embodiment.

An example of processing at a subset boundary will be described below. FIG. 10 is a flowchart illustrating an example of a processing procedure corresponding to a content related to a subset boundary using the syntax example illustrated in FIG. 9.

First, three-dimensional data encoding device 100 determines whether a processing target reference position is located at a subset boundary, for example, by the method described above (S101). If the processing target reference position is located at the subset boundary (Yes in S101), three-dimensional data encoding device 100 adds end_of_subset to the bitstream (S102). Next, three-dimensional data encoding device 100 performs the arithmetic code terminate process (S103).

Next, based on sps_subset_dependency_exist_flag, three-dimensional data encoding device 100 refers to information on processed subsets to determine whether a processing target subset can be processed (S104). If it is impossible to refer to the information on the processed subset (No in S104), three-dimensional data encoding device 100 resets a buffer in which processed parameters to be referred to by prediction are stored (S105), and resets a buffer in which processed parameters to be referred to in the context selection are stored, and a context (S107).

On the other hand, if the information of the processed subset can be referred to (Yes in S104), three-dimensional data encoding device 100 refers to the information of the processed subset based on sps_subset_dependent_cabac_flag to determine whether the context selection of the processing target subset can be performed (S106). If the information of the processed subset cannot be referred to (No in S106), three-dimensional data encoding device 100 resets the buffer in which the processed parameters to be referred to in the context selection are stored, and the context (S107).

Note that whether or not to perform the terminate process may be switched according to the value of end_of_subset as described above. If the terminate process is not performed, the processing of step S103 onward is omitted. Further, if end_of_subset is not used and the terminate process is always performed at the subset boundary, step S102 may be omitted.

Further, the same processing as described above is also performed in three-dimensional data decoding device 200. Note that, in step S102, three-dimensional data decoding device 200 acquires end_of_subset from the bitstream, and determines whether to perform the processing of step S103 onward according to the value of end_of_subset. Further, when the processing of step S102 is omitted in three-dimensional data encoding device 100, the processing of step S102 is likewise omitted in three-dimensional data decoding device 200.

Further, the terminate process in three-dimensional data decoding device 200 includes processing of removing the bit pattern added in the byte alignment processing by three-dimensional data encoding device 100.

As described above, by making it possible to refer to information of processed subsets when performing subset division, it is possible to shorten the time required from encoding until decoding while restraining deterioration in coding efficiency caused by division to the minimum level. Further, by prohibiting only information affecting context selection from being referred to beyond subset boundaries, arithmetic decoding of individual subsets can be performed independently of one another, so that it may be possible to enhance error resilience while restraining deterioration in coding efficiency. Further, by prohibiting information of processed subsets from being referred to, it is possible to perform parallel processing in a subset unit while restraining the overhead of division as compared with a case where division having a header such as a slice is performed, and it may be possible to enhance the throughput of encoding processing and decoding processing.

Note that three-dimensional data encoding device 100 may packetize and transmit encoded data for each subset in a subset unit. As a result, it is possible to advance the start time of packet transmission, thereby enabling delayed transmission. In this case, three-dimensional data decoding device 200 can generate an original bitstream by combining encoded data for each subset included in a plurality of received packets.

Further, three-dimensional data encoding device 100 may store subset identification information for identifying the order of subsets into encoded data for each subset. For example, the subset identification information may be a serial number or the like.

As a result, three-dimensional data decoding device 200 can specify the order of column_pos of a subset from this subset identification number and information regarding the size of the subset (for example, the number of column_pos indicating the index of horizontal angle $\phi j$). Therefore, for example, even when some packets packetized in a subset unit are lost during a transmission process, three-dimensional data decoding device 200 uses the subset identification information to make it possible to determine a lost subset and skip processing for each column of the lost subset.

Further, since three-dimensional data decoding device 200 can decode each subset independently even when the subsets are not received in order because the columns of the subsets can be specified. In other words, three-dimensional data decoding device 200 can perform parallel processing on encoded data items of a plurality of subsets. Still further, three-dimensional data decoding device 200 can restore point cloud data of one frame by identifying the position of each subset in the entire frame using the column position of each decoded subset, and combining the point cloud data (position information) of the plurality of subsets.

Note that, in the above description, a case where reference positions are used as illustrated in FIG. 3, etc., has been described as an example, but the above subset division may also be applied even when other encoding methods are used. For example, the above subset division may be applied when a prediction tree indicating reference relationship in prediction is used. In this case, for example, a stream (encoded data) is subjected to the terminate process at every predetermined horizontal angle, whereby the stream is divided into a plurality of subsets.

Figure 11:
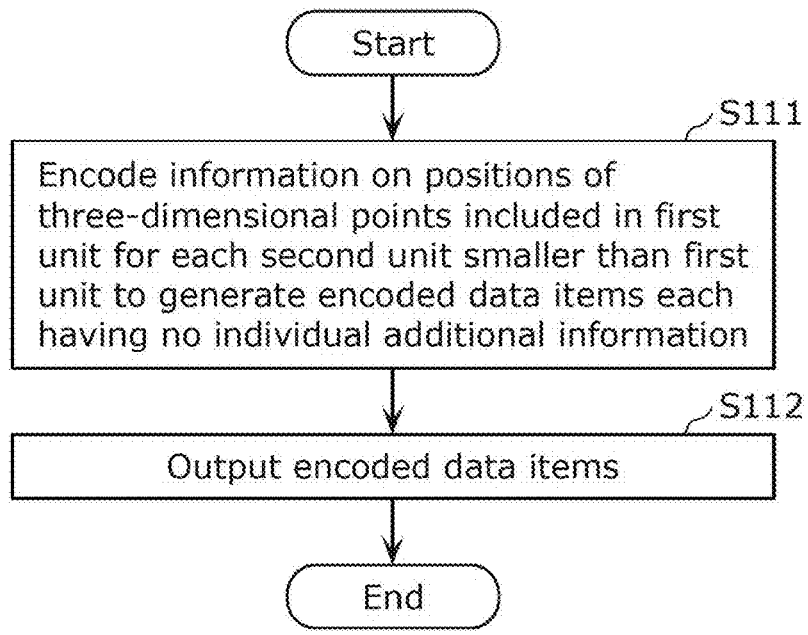
FIG. 11 is a flowchart of three-dimensional data encoding processing according to the embodiment.

As described above, the three-dimensional data encoding device according to the present embodiment performs the process shown in FIG. 11. The three-dimensional data encoding device generates encoded data items by encoding information on positions of three-dimensional points included in a first unit (for example, a slice, a tile or a frame) which is a coding unit, for each second unit (for example, the subset described above) smaller than the first unit (S111), and outputs the encoded data items (S112), each of the encoded data items having no individual additional information (e.g. header and footer). For example, encoded data of each of second units may be sequentially generated while encoded data of the first unit is being generated. In this case, the three-dimensional data encoding device may sequentially transmit the generated encoded data of the second unit without waiting for generation of all the encoded data of the first unit.

According to the foregoing, the three-dimensional data encoding device can output the encoded data of the second unit without waiting for the encoded data of the first unit to be collected to the end. This can make it possible to shorten the delay time from generation of encoded data until output of the encoded data. Further, since the encoded data of the second unit does not have any individual additional information, it is possible to restrain an increase in processing amount for generating encoded data items of the second unit as compared with a case where the encoded data of the second unit has individual additional information. Further, since the second unit is not limited to a unit having additional information, the degree of freedom in generation of the encoded data of the second unit can be enhanced. As a result, for example, the sizes of encoded data items can be adjusted to a size suitable for transmission.

For example, encoded data items have common additional information (for example, a slice header, a tile header, a frame header, SPS, or GPS).

For example, the common additional information includes first information (for example, sps_subset_size_minus1) indicating the size of a first encoded data item included in encoded data items. In other words, the three-dimensional data encoding device stores the first information in the common additional information. According to the foregoing, the three-dimensional data decoding device can specify the termination of the first encoded data item using the first information. Note that the sizes of the encoded data items may be the same or different from one another. When the sizes of the encoded data items are different, the first information may indicate the size of each of the encoded data items.

For example, with respect to information about positions of three-dimensional points, each of the positions is expressed by a distance component, a first direction component, and a second direction component (for example, a distance, a horizontal angle, and an elevation angle). For example, each of the positions is represented in a polar coordinate system. The three-dimensional data encoding device encodes information about positions of three-dimensional points using predetermined reference positions. Each of the reference positions includes a first direction component and a second direction component (for example, a horizontal angle and an elevation angle). The first information indicates the size of the first direction component of the first encoded data item (for example, the number of columns included in one second unit in FIG. 3) as the size of the second unit. According to the foregoing, the size of encoded data can be expressed by the size of the first direction component, so that the data amount of the first information can be reduced as compared with a case where the size of encoded data is expressed by the distance component, the first direction component, and the second direction component.

Note that the first information may be information indicating reference positions or three-dimensional points included in the first encoded data item, or may be information indicating the data size (for example, the number of bytes) of the first encoded data item. For example, the first information may indicate the number of reference positions or three-dimensional points included in the first encoded data item among reference positions. Further, the number of reference positions may be indicated by the number of columns or rows of the reference positions.

For example, each of encoded data items includes second information (end_of_subset) indicating whether the terminate process is performed on the encoded data. In other words, the three-dimensional data encoding device adds the second information to each of the encoded data items. For example, based on second information included in second encoded data to be processed, the three-dimensional data encoding device switches whether the terminate process is performed on the second encoded data.

According to the foregoing, it is possible to select whether the terminate process is performed in each second unit specified by the first information. Therefore, the degree of freedom in data division can be enhanced.

For example, the common additional information includes third information (For example, sps_subset_dependency_exist_flag) indicating whether an other encoded data item included in encoded data items is used in encoding of a first encoded data item included in the encoded data items. In other words, the three-dimensional data encoding device stores the third information into the common additional information. For example, the third information indicates whether the first encoded data item refers to an other encoded data item which are included in the encoded data items and have been encoded. For example, when the third information indicates that the other encoded data item is used in encoding the first encoded data item, the three-dimensional data encoding device refers to (for example, uses for prediction,) the information of the three-dimensional points corresponding to the other encoded data item which have been encoded when the three-dimensional points corresponding to the first encoded data item are encoded. Alternatively, the three-dimensional data encoding device determines a context to be used for arithmetic encoding of the information of the three-dimensional points corresponding to the first encoded data item by using the information of the three-dimensional points corresponding to the other encoded data item which have been encoded. Alternatively, the three-dimensional data encoding device continues to use the context used for the arithmetic encoding on the information of the three-dimensional points corresponding to the other encoded data item that has already been encoded. On the other hand, when the third information indicates that the other encoded data item is not used for encoding of the first encoded data item, the three-dimensional data encoding device does not refer to the information of the three-dimensional points corresponding to the other encoded data item which has already been encoded when the three-dimensional points corresponding to the first encoded data item are encoded. Alternatively, the three-dimensional data encoding device does not determine a context to be used for the arithmetic encoding of the information of the three-dimensional points corresponding to the first encoded data item by using the information of the three-dimensional points corresponding to the other encoded data item which has already been encoded. Alternatively, the three-dimensional data encoding device does not continue to use the context used for the arithmetic encoding of the information of the three-dimensional points corresponding to the other encoded data item which has already been encoded.

According to the foregoing, it is possible to switch whether encoded data depends on an other encoded data item. For example, the code efficiency can be enhanced by making encoded data dependent on an other encoded data item. Alternatively, encoded data is not made dependent on an other encoded data item, whereby each of encoded data items can be processed independently, so that parallel processing or the like can be implemented.

For example, the common additional information includes fourth information (sps_subset_dependent_cabac_flag) indicating whether the context to be used for arithmetic encoding on a first encoded data item included in encoded data items depends on an other encoded data item included in encoded data items. In other words, the three-dimensional data encoding device stores the fourth information into the common additional information. For example, when it is indicated by the fourth information that the context to be used for arithmetic encoding on a first encoded data item depends on an other encoded data item, the three-dimensional data encoding device determines the context to be used for arithmetic encoding of the information of three-dimensional points corresponding to the first encoded data item by using the information of the three-dimensional points corresponding to the other encoded data item which has already been encoded. Alternatively, the three-dimensional data encoding device continues to use the context used for arithmetic encoding of the information of three-dimensional points corresponding to the other encoded data item which has already been encoded. On the other hand, when it is indicated by the fourth information that the context to be used for arithmetic encoding on a first encoded data item does not depend on an other encoded data item, the three-dimensional data encoding device does not determine the context to be used for arithmetic encoding of the information of three-dimensional points corresponding to the first encoded data item by using the information of the three-dimensional points corresponding to the other encoded data item which has already been encoded. Alternatively, the three-dimensional data encoding device does not continue to use the context used for arithmetic encoding of the information of three-dimensional points corresponding to an other encoded data item which has already been encoded.

According to the foregoing, it is possible to switch whether encoded data depends on an other encoded data item. For example, the coding efficiency can be enhanced by making encoded data dependent on an other encoded data item. Alternatively, encoded data is not made dependent on an other encoded data item, whereby each of encoded data items can be processed independently, so that parallel processing or the like can be implemented.

For example, the three-dimensional data encoding device includes a processor and memory. Using the memory, the processor performs the above process.

Figure 12:
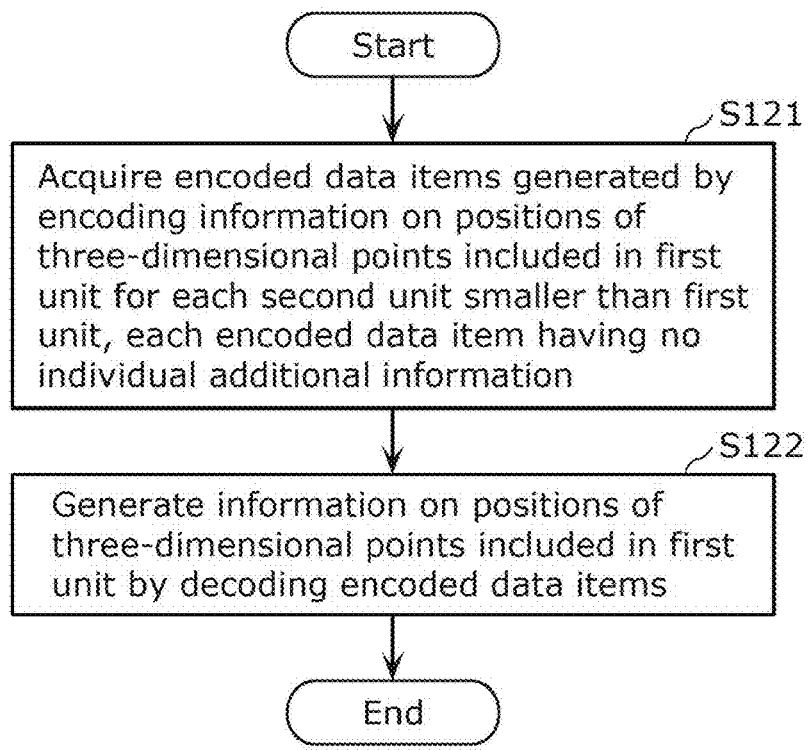
FIG. 12 is a flowchart of three-dimensional data decoding processing according to the embodiment.

The three-dimensional data decoding device according to the present embodiment performs the process shown in FIG. 12. The three-dimensional data decoding device: obtains encoded data items generated by encoding, for each of second units (e.g., the above-described subsets), information about positions of three-dimensional points included in a first unit (e.g., a slice, a tile, or a frame), the second units being smaller than the first unit that is an encoding unit (S121); and decodes the encoded data items to generate the information about the positions of the three-dimensional points included in the first unit (S122). Each of the encoded data items includes no individual additional information. It should be noted that the obtaining of encoded data items may be sequentially performed, and the three-dimensional data decoding device may sequentially perform a decoding process on received encoded data without waiting for reception of all encoded data. In addition, the three-dimensional data decoding device may process a plurality of encoded data in parallel.

According to the foregoing, the three-dimensional data decoding device can start decoding encoded data of the second unit without waiting for encoded data of the first unit to be collected to the end. As a result, the delay time from reception of encoded data to start of decoding of the encoded data can be shortened. Further, since the encoded data of the second unit does not have individual additional information, it is possible to restrain an increase in processing amount for analyzing encoded data items of the second unit as compared with a case where the encoded data of the second unit has individual additional information. Further, the second unit is not limited to a unit having additional information, so that the degree of freedom in generating the encoded data of the second unit can be enhanced. As a result, for example, encoded data items can be adjusted to have a size suitable for transmission.

For example, encoded data items have common additional information (for example, a slice header, a tile header, a frame header, SPS, or GPS).

For example, the common additional information includes first information (for example, sps_subset_size_minus1) indicating the size of a first encoded data item included in encoded data items. For example, the three-dimensional data decoding device acquires the first information from the common additional information, and uses the first information to identify the termination of the first encoded data item. According to the foregoing, the three-dimensional data decoding device can identify the termination of the first encoded data item by using the first information. Note that the sizes of the encoded data items may be the same or different. When the sizes of the encoded data items are different, the first information may indicate the size of each of the encoded data items.

For example, each of position information items includes a distance component, a first direction component, and a second direction component (for example, a distance, a horizontal angle, and an elevation angle). For example, each of the position information items is expressed in a polar coordinate system. The three-dimensional data encoding device encodes position information items of three-dimensional points by using predetermined reference positions. Each of the reference positions includes a first direction component and a second direction component (for example, a horizontal angle and an elevation angle). The first information indicates, as the size of the second unit, the size of the first direction component of the second unit (for example, the number of columns included in one second unit in FIG. 3). According to the foregoing, since the size of the second unit can be expressed by the size of the first direction component, the data amount of the first information can be reduced.

For example, each of the encoded data items includes second information (end_of_subset) indicating whether the terminate process is performed on the encoded data. For example, the three-dimensional data decoding device switches, based on the second information included in encoded data of the processing target, whether the terminate process is performed on the encoded data.

According to the foregoing, in the three-dimensional data encoding device, it is possible to select whether the terminate process is performed in a second unit specified by first information. Therefore, the degree of freedom in data division can be enhanced.

For example, the common additional information may include third information (For example, sps_subset_dependency_exist_flag) indicating whether an other encoded data item included in encoded data items is used in encoding a first encoded data item included in the encoded data items. For example, the three-dimensional data decoding device acquires the third information from the common additional information. For example, the third information indicates whether the first encoded data item refers to an other encoded data item which are included in the encoded data items and have already been decoded. For example, when it is indicated by the third information that an other encoded data item is used in encoding a first encoded data item, the three-dimensional data decoding device refers to (for example, uses for prediction,) the information of three-dimensional points corresponding to an other encoded data item which has already been decoded when the three-dimensional points corresponding to the firs encoded data are decoded. Alternatively, the three-dimensional data decoding device determines a context to be used for arithmetic decoding on the information of three-dimensional points corresponding to the first encoded data item by using the information of three-dimensional points corresponding to the other encoded data item which has already been decoded. Alternatively, the three-dimensional data decoding device continues to use the context used for arithmetic decoding on the information of three-dimensional points corresponding to the other encoded data item which has already been decoded. On the other hand, when it is indicated by the third information that an other encoded data item is not used in encoding the first encoded data item, the three-dimensional data decoding device does not refer to the information of three-dimensional points corresponding to an other encoded data item which has already been decoded when the three-dimensional points corresponding to the first encoded data item are decoded. Alternatively, the three-dimensional data decoding device does not determine a context to be used for arithmetic decoding of the information of three-dimensional points corresponding to the first encoded data item by using the information of three-dimensional points corresponding to the other encoded data item which has already been decoded. Alternatively, the three-dimensional data decoding device does not continue to use the context used for arithmetic decoding of the information of three-dimensional points corresponding to the other encoded data item which has already been decoded.

According to the foregoing, in the three-dimensional data encoding device, it is possible to switch whether encoded data depends on an other encoded data item. For example, the coding efficiency can be enhanced by making encoded data dependent on an other encoded data item. Alternatively, encoded data is not made dependent on an other encoded data item, whereby each of encoded data items can be processed independently, so that parallel processing or the like can be implemented.

For example, the common additional information includes fourth information (sps_subset_dependent_cabac_flag) indicating whether a context to be used for arithmetic decoding on a first encoded data item included in encoded data items depends on an other encoded data item included in the encoded data items. For example, the three-dimensional data decoding device acquires the fourth information from the common additional information. For example, when it is indicated by the fourth information that a context to be used for arithmetic decoding on a first encoded data item depends on an other encoded data item, the three-dimensional data decoding device determines a context to be used for arithmetic decoding on the information of three-dimensional points corresponding to the first encoded data item by using the information of three-dimensional points corresponding to an other encoded data item which has already been decoded. Alternatively, the three-dimensional data decoding device continues to use the context used for arithmetic decoding on the information of three-dimensional points corresponding to the other encoded data item which has already been decoded. On the other hand, when it is indicated by the fourth information that the context to be used for arithmetic decoding on the first encoded data item does not depend on the other encoded data item, the three-dimensional data decoding device does not determine a context to be used for arithmetic decoding on the information of three-dimensional points corresponding to the first encoded data item by using the information of three-dimensional points corresponding to the other encoded data item which has already been decoded. Alternatively, the three-dimensional data decoding device does not continue to use the context used for arithmetic decoding on the information of three-dimensional points corresponding to the other encoded data item which has already been decoded.

According to the foregoing, in the three-dimensional data encoding device, it is possible to switch whether encoded data depends on an other encoded data item. For example, the coding efficiency can be enhanced by making encoded data dependent on an other encoded data item. Alternatively, encoded data is not made dependent on an other encoded data item, whereby each of encoded data items can be processed independently, so that parallel processing or the like can be implemented.

For example, the three-dimensional data decoding device includes a processor and memory. Using the memory, the processor performs the above process.

A three-dimensional data encoding device, a three-dimensional data decoding device, and the like according to the embodiments of the present disclosure have been described above, but the present disclosure is not limited to these embodiments.

Note that each of the processors included in the three-dimensional data encoding device, the three-dimensional data decoding device, and the like according to the above embodiments is typically implemented as a large-scale integrated (LSI) circuit, which is an integrated circuit (IC). These may take the form of individual chips, or may be partially or entirely packaged into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

The present disclosure may also be implemented as a three-dimensional data encoding method, a three-dimensional data decoding method, or the like executed by the three-dimensional data encoding device, the three-dimensional data decoding device, and the like.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

A three-dimensional data encoding device, a three-dimensional data decoding device, and the like according to one or more aspects have been described above based on the embodiments, but the present disclosure is not limited to these embodiments. The one or more aspects may thus include forms achieved by making various modifications to the above embodiments that can be conceived by those skilled in the art, as well forms achieved by combining structural components in different embodiments, without materially departing from the spirit of the present disclosure.

INDUSTRIAL APPLICABILITY

The present disclosure is applicable to a three-dimensional data encoding device and a three-dimensional data decoding device.

The invention claimed is:

1. A three-dimensional data encoding method comprising:
encoding, for each of second units, information about positions of three-dimensional points included in a first unit, to generate encoded data items, the second units being smaller than the first unit that is an encoding unit; and
outputting the encoded data items,
wherein each of the encoded data items includes no individual additional information,
the encoded data items include common additional information, and
the common additional information includes first information indicating a size of a first encoded data item included in the encoded data items.

2. The three-dimensional data encoding method according to claim 1,
wherein the information about the positions of the three-dimensional points expresses each of the positions using a distance component, a first direction component, and a second direction component,
the information about the positions of the three-dimensional points is encoded using predetermined reference positions,
each of the reference positions contains the first direction component and the second direction component, and
the first information indicates a size of the first direction component in the first encoded data item.

3. The three-dimensional data encoding method according to claim 1,
wherein each of the encoded data items includes second information indicating whether a terminate process is performed on the encoded data item.

4. The three-dimensional data encoding method according to claim 1,
wherein the common additional information includes third information indicating whether an other encoded data item included in the encoded data items is used in encoding a first encoded data item included in the encoded data items.

5. The three-dimensional data encoding method according to claim 1,
wherein the common additional information includes fourth information indicating whether a context depends on an other encoded data item included in the encoded data items, the context being used in arithmetic encoding a first encoded data item included in the encoded data items.

6. The three-dimensional data encoding method according to claim 1,
wherein the size indicated in the first information is a horizontal angle.

7. A three-dimensional data decoding method comprising:
obtaining encoded data items generated by encoding, for each of second units, information about positions of three-dimensional points included in a first unit, the second units being smaller than the first unit that is an encoding unit; and
decoding the encoded data items to generate the information about the positions of the three-dimensional points included in the first unit,
wherein each of the encoded data items includes no individual additional information,
the encoded data items include common additional information, and
the common additional information includes first information indicating a size of a first encoded data item included in the encoded data items.

8. The three-dimensional data decoding method according to claim 7,
wherein the information about the positions of the three-dimensional points expresses each of the positions using a distance component, a first direction component, and a second direction component,
the information about the positions of the three-dimensional points is encoded using predetermined reference positions,
each of the reference positions contains the first direction component and the second direction component, and
the first information indicates a size of the first direction component in the first encoded data item.

9. The three-dimensional data decoding method according to claim 7,
wherein each of the encoded data items includes second information indicating whether a terminate process is performed on the encoded data item.

10. The three-dimensional data decoding method according to claim 7,
wherein the common additional information includes third information indicating whether an other encoded data item included in the encoded data items is used in encoding a first encoded data item included in the encoded data items.

11. The three-dimensional data decoding method according to claim 7,
wherein the common additional information includes fourth information indicating whether a context depends on an other encoded data item included in the encoded data items, the context being used in arithmetic encoding a first encoded data item included in the encoded data items.

12. The three-dimensional data decoding method according to claim 7,
wherein the size indicated in the first information is a horizontal angle.

13. A three-dimensional data encoding device comprising:
a processor; and
memory,
wherein using the memory, the processor:
encodes, for each of second units, information about positions of three-dimensional points included in a first unit, to generate encoded data items, the second units being smaller than the first unit that is an encoding unit; and
outputs the encoded data items,
wherein each of the encoded data items includes no individual additional information, the encoded data items include common additional information, and the common additional information includes first information indicating a size of a first encoded data item included in the encoded data items.

14. A three-dimensional data decoding device comprising:

a processor; and memory, wherein using the memory, the processor:

obtains encoded data items generated by encoding, for each of second units, information about positions of three-dimensional points included in a first unit, the second units being smaller than the first unit that is an encoding unit; and decodes the encoded data items to generate the information about the positions of the three-dimensional points included in the first unit, wherein each of the encoded data items includes no individual additional information, the encoded data items include common additional information, and the common additional information includes first information indicating a size of a first encoded data item included in the encoded data items.

* * * * *